United States Patent
D'Silva et al.

(10) Patent No.: US 10,619,426 B2
(45) Date of Patent: Apr. 14, 2020

(54) TORQUE CONNECTOR SYSTEMS, APPARATUS, AND METHODS

(71) Applicant: Halliburton Energy Services, Inc., Houston, TX (US)

(72) Inventors: Alben D'Silva, Edmonton (CA); Neil Roy Choudhury, Edmonton (CA)

(73) Assignee: Halliburton Energy Services, Inc., Houston, TX (US)

( * ) Notice: Subject to any disclaimer, the term of this patent is extended or adjusted under 35 U.S.C. 154(b) by 247 days.

(21) Appl. No.: 15/523,103

(22) PCT Filed: Dec. 30, 2014

(86) PCT No.: PCT/US2014/072757
§ 371 (c)(1),
(2) Date: Apr. 28, 2017

(87) PCT Pub. No.: WO2016/108844
PCT Pub. Date: Jul. 7, 2016

(65) Prior Publication Data
US 2017/0328140 A1    Nov. 16, 2017

(51) Int. Cl.
*E21B 17/042* (2006.01)
*E21B 43/10* (2006.01)
(Continued)

(52) U.S. Cl.
CPC ........ *E21B 17/0426* (2013.01); *E21B 17/042* (2013.01); *E21B 43/105* (2013.01);
(Continued)

(58) Field of Classification Search
CPC .. E21B 17/042; E21B 17/0426; F16L 15/004; F16L 15/009; F16L 15/04
(Continued)

(56) References Cited

U.S. PATENT DOCUMENTS

| | | | | |
|---|---|---|---|---|
| 262,086 | A | * | 8/1882 | Mithoff .................. F16L 13/04 285/148.7 |
| 1,349,518 | A | * | 8/1920 | Lyle ...................... E21B 17/042 285/333 |

(Continued)

FOREIGN PATENT DOCUMENTS

| | | |
|---|---|---|
| CN | 104903538 | 9/2015 |
| CN | 104903538 A | 9/2015 |

(Continued)

OTHER PUBLICATIONS

International Search Report and Written Opinion issued in corresponding PCT application No. PCT/US2014/072757, dated Sep. 1, 2015, 19 pgs.

*Primary Examiner* — David Bochna
(74) *Attorney, Agent, or Firm* — Chamberlain Hrdlicka (57) ABSTRACT

A tubular string comprises a plurality of torque connectors connecting a plurality of tubular members. At least one torque connector of the plurality of torque connectors comprises a pin component threadably connected to the box component. The pin comprises a three torque shoulders corresponding to three surfaces of the box component. In at least one embodiment, a sacrificial material is deposited between one of the torque shoulders and one of the surfaces to provide additional torque capacity to the torque connector. Additional apparatus, methods, and systems are disclosed.

17 Claims, 4 Drawing Sheets

(51) Int. Cl.
 *F16B 31/02* (2006.01)
 *F16L 15/06* (2006.01)

(52) U.S. Cl.
 CPC .......... *E21B 43/106* (2013.01); *F16B 31/025* (2013.01); *F16L 15/06* (2013.01)

(58) Field of Classification Search
 USPC .................................................. 285/333, 334
 See application file for complete search history.

(56) References Cited

U.S. PATENT DOCUMENTS

| | | | | |
|---|---|---|---|---|
| 2,181,343 A * | 11/1939 | Reimschissel | .......... | F16L 15/04 285/332.3 |
| 2,907,589 A * | 10/1959 | Knox | .................... | E21B 17/042 285/332.2 |
| 3,754,609 A * | 8/1973 | Garrett | .................. | E21B 17/042 175/323 |
| 3,923,324 A * | 12/1975 | Cruickshank | ......... | E21B 17/042 175/325.2 |
| 3,978,933 A * | 9/1976 | Olson | .................... | E21B 10/46 175/325.2 |
| 4,026,583 A * | 5/1977 | Gottlieb | .............. | E21B 17/0423 228/107 |
| 4,658,915 A * | 4/1987 | Goris | .................... | E21B 17/043 166/77.51 |
| 4,693,498 A * | 9/1987 | Baugh | ................... | F16L 15/007 285/39 |
| 4,707,001 A * | 11/1987 | Johnson | ................ | E21B 17/042 285/332.3 |
| 4,928,999 A * | 5/1990 | Landriault | .......... | E21B 17/0423 285/113 |
| 5,066,052 A * | 11/1991 | Read | ..................... | E21B 17/042 285/334 |
| 5,253,902 A * | 10/1993 | Petelot | .................. | F16L 15/001 148/277 |
| 5,492,375 A | 2/1996 | Smith | | |
| 5,908,212 A | 6/1999 | Smith et al. | | |
| 5,921,591 A | 7/1999 | Argent | | |
| 6,811,189 B1 * | 11/2004 | DeLange | .............. | F16L 15/009 285/332.1 |
| 6,971,681 B2 * | 12/2005 | Dell'Erba | ............ | F16L 15/001 285/55 |
| 7,028,788 B2 * | 4/2006 | Strand | ................... | E21B 17/042 166/242.6 |
| 7,077,197 B2 * | 7/2006 | Harrall | .................. | E21B 17/042 166/242.1 |
| 7,686,351 B2 * | 3/2010 | Molina, III | ............ | F16J 15/061 285/353 |
| 7,740,285 B2 * | 6/2010 | Nagasaku | ............. | F16L 15/001 285/94 |
| 7,770,935 B2 * | 8/2010 | Imai | ...................... | F16L 58/182 285/333 |
| 8,052,173 B2 * | 11/2011 | Carcagno | ............. | E21B 17/042 285/333 |
| 9,638,362 B2 * | 5/2017 | Marchand | ............... | F16L 15/08 |
| 9,752,710 B2 * | 9/2017 | Goto | ...................... | F16L 15/04 |
| 10,012,332 B2 * | 7/2018 | Goto | .................... | E21B 17/042 |
| 2003/0047588 A1 | 3/2003 | Filippov et al. | | |
| 2003/0222455 A1 | 12/2003 | Cook et al. | | |
| 2004/0090068 A1 | 5/2004 | Evans et al. | | |
| 2005/0133223 A1 | 6/2005 | Harrall | | |
| 2005/0279513 A1 | 12/2005 | Eppink et al. | | |
| 2008/0303275 A1 | 12/2008 | Johnson | | |
| 2010/0230958 A1 | 9/2010 | Holland | | |

FOREIGN PATENT DOCUMENTS

| | | |
|---|---|---|
| EA | 010138 B1 | 6/2008 |
| RU | 2354799 C1 | 5/2009 |
| WO | 2014108756 A1 | 7/2014 |
| WO | 2014151886 A2 | 9/2014 |

* cited by examiner

TORQUE CONNECTOR SYSTEMS, APPARATUS, AND METHODS

BACKGROUND

Downhole tubular strings, such as drill strings, comprise connectors that are subjected to torque as the tubular members of the strings are manipulated. Conventional connectors that do not have a high enough torque capacity may be susceptible to failure. Further, some conventional connectors require precision machining that is costly and prone to inaccuracies in production. Using conventional manufacturing techniques, it can be difficult, if not impossible, to achieve sufficient torque capacity without increasing the size of the connector.

BRIEF DESCRIPTION OF THE DRAWINGS

The present disclosure may be better understood, and its numerous features and advantages made apparent to those of ordinary skill in the art by referencing the accompanying drawings. The use of the same reference symbols in different drawings indicates similar or identical items.

DETAILED DESCRIPTION

FIGS. 1-5 illustrate example apparatus, systems, and methods for related to improved torque connectors. The torque connector generally comprises a box component and a pin component. In some embodiments, the pin component has three torque shoulders corresponding to three surfaces of the box component. When the pin is inserted into, and coupled to, the box component, each of the three torque shoulders come in contact with each of the corresponding three surfaces of the box component to add to the total torque capacity of the torque connector. In some embodiments a sacrificial material is disposed between one of the torque shoulders and the corresponding surface of the box component, such that when the pin component is coupled to the box component, the sacrificial material deforms in a direction non-parallel to the direction of insertion. In some embodiments, one of the torque shoulders of the pin component comprises a collar that is threadably coupled to the pin component. The three contact points between the torque shoulders of the pin component and the surfaces of the box component facilitate an increased torque capacity for the torque connector without increasing the overall size of the torque connector, without any need for precision machining.

Figure 1:
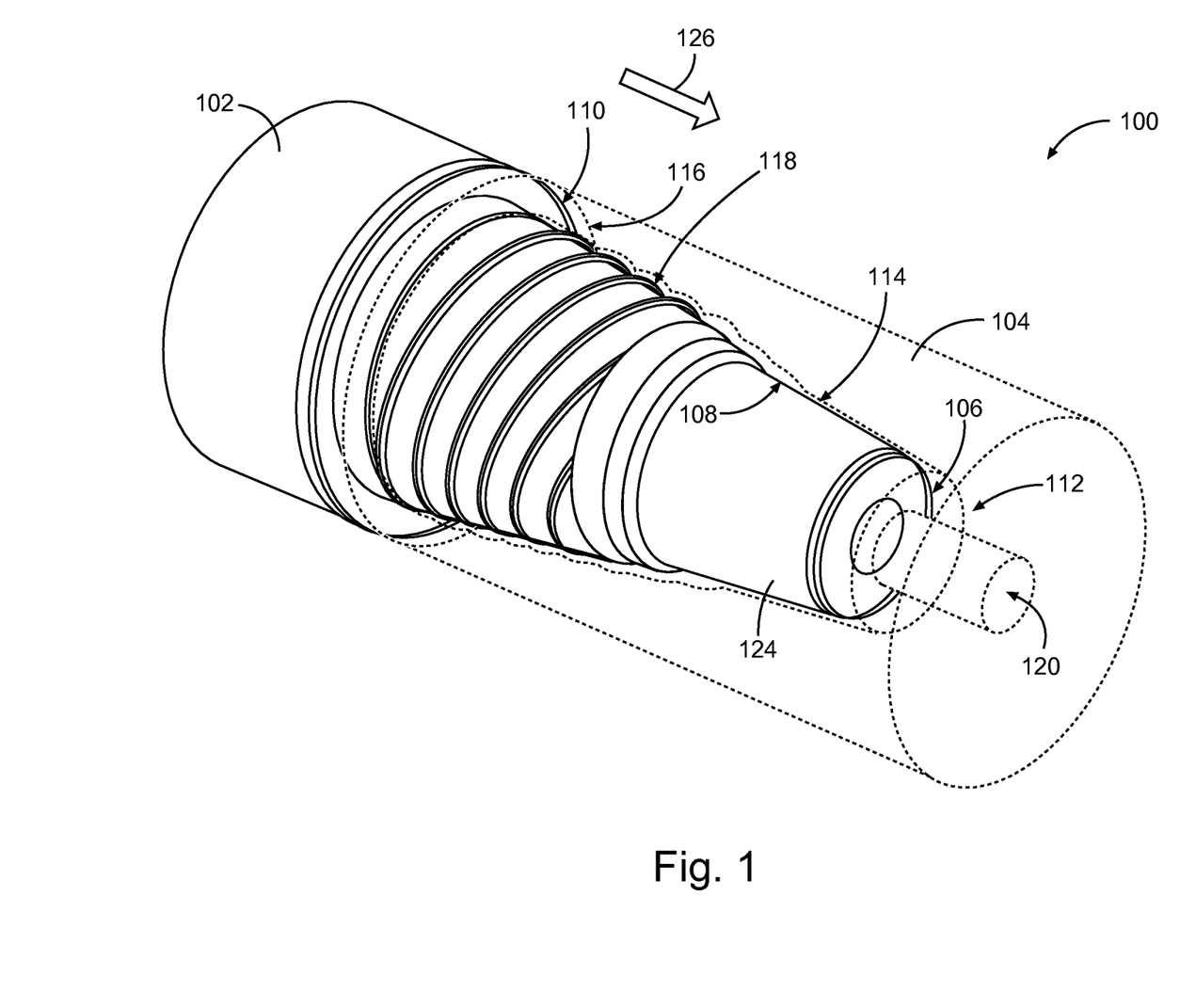
FIG. 1 depicts a decoupled view of an example torque connector, in accordance with some embodiments.

FIG. 1 depicts an example torque connector 100, in accordance with some embodiments. The torque connector 100 generally comprises a pin component 102 and a box component 104. In at least one embodiment, the pin component 102 comprises three torque shoulders 106, 108, 110 to correspond to three surfaces 112, 114, 116 of the box component 104. In some embodiments, a first torque shoulder 106 comprises a leading surface of the pin component 102. For purposes of this disclosure, the "leading surface" can be understood to mean the surface of an element that is closest to the point of insertion as the two elements are coupled together.

While in the illustrated embodiment the first torque shoulder 106 is perpendicular to a longitudinal axis of the pin component 102, in at least one embodiment, the first torque shoulder 106 is non-perpendicular to the longitudinal axis of the pin component 102. In some embodiments, the angle of the first torque shoulder 106 relative to the direction of insertion of the pin component 102 into the box component 104 is approximately equal to the angle of a corresponding first surface 112 of the box component 104 relative to the direction of the insertion of the pin component 102 into the box component 104. In at least one embodiment, the first torque shoulder 106 and the first surface 112 are non-perpendicular to the direction of insertion of the pin component 102 into the box component 104 to increase the torque capacity relative to a perpendicular orientation.

In at least one embodiment, a second torque shoulder 108 and a corresponding second surface 114 are nonparallel relative to the direction of the insertion 126 of the pin component 102 into the box component 104. In some embodiments, a sacrificial material 124 is disposed between the second torque shoulder 108 and the second surface 114. In at least one embodiment, the sacrificial material 124 deforms when the pin component 102 is coupled to the box component 104. For example, in some embodiments, the sacrificial material 124 deforms in a direction that is non-parallel to the direction of insertion 126 of the pin component 102 into the box component 104.

In at least one embodiment, the sacrificial material 124 is to increase the torque capacity of the torque connector 100 when the pin component 102 is coupled to the box component 104. In at least one embodiment, the sacrificial material 124 has a coefficient of thermal expansion that is greater than a coefficient of thermal expansion for the pin component 102 or the box component 104. In different embodiments, the sacrificial material 124 may comprise any of a variety of materials, for example, copper, beryllium copper, aluminum bronze, copper-nickel-tin alloy, nickel-beryllium alloy, a combination of these, or the like. In some embodiments, the sacrificial material 124 can comprise any deformable material. In some embodiments, the sacrificial material 124 is selected based on a desired torque capacity for the torque connector 100. In some embodiments, the sacrificial material 124 is attached to the pin component 102 or the box component 104. In at least one embodiment, the sacrificial material 124 facilitates a connection between the second torque shoulder 108 of the pin component 102 and the second surface 114 of the box component 104 even when the torque connector 100 comprises a clearance fit between the second torque shoulder 108 and the second surface 114. For example, in at least one embodiment, the torque connector 100 comprises a clearance fit of about 1% to about 5% of a largest outer diameter of the pin component 102. In at least one embodiment, the sacrificial material 124 obviates the need for precision manufacturing of the pin component 102 or the box component 104.

In some embodiments, a third torque shoulder 110 of the pin component 102 is to contact a third surface 116 of the box component 104 to provide a third torque capacity to the torque connector 100. In at least one embodiment, the third torque shoulder 110 comprises a collar. In some embodiments, the third torque shoulder 110 comprises a collar that is threaded onto the pin component 102. In at least one embodiment, the third torque shoulder 110 obviates the need for precision manufacturing of the pin component 102 or the box component 104. In some embodiments, the pin component 102 is to threadably couple to the box component 104 via threaded surface 118. While the illustrated embodiment depicts the threaded surface 118 between the second torque shoulder 108 and the third torque shoulder 110, in other embodiments the threaded surface 118 may be located anywhere on the pin component 102. For example, in at least one embodiment, the threaded surface 118 is located between the first torque shoulder 106 and the second torque shoulder 108. The corresponding threads of the box component 104 may similarly differ in location in various embodiments.

Figure 2:
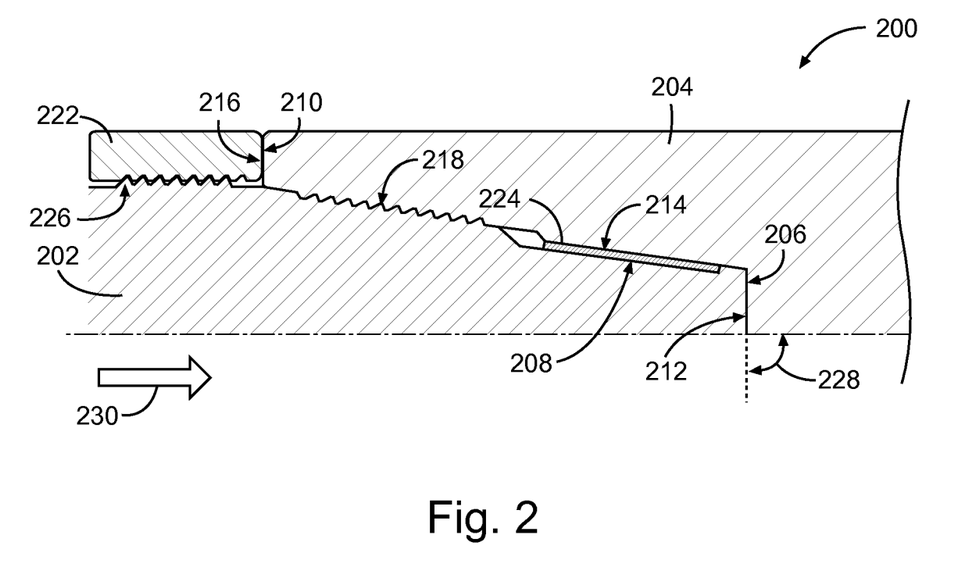
FIG. 2 depicts a cross-section view of another example torque connector, in accordance with some embodiments.

FIG. 2 depicts a cross-section view of an example torque connector 200, in accordance with some embodiments. A pin component 202 is coupled to a box component 204 via threaded surface 218. A first torque shoulder 206 of the pin component 202 is in contact with a first surface 212 of the box component 204 to provide a first torque capacity to the torque connector 200. In the illustrated embodiment, the angle 228 of the first torque shoulder 206 and the first surface 212 is approximately 90° relative to a direction of insertion 230 of the pin component 202 into the box component 204.

A sacrificial material 224 is disposed between a second torque shoulder 208 of the pin component 202 and a second surface 214 of the box component 204. In at least one embodiment, the sacrificial material 224 is attached to the second torque shoulder 208 or the second surface 214. In at least one embodiment, the sacrificial material 224 is compressed between the second torque shoulder 208 and the second surface 214 in a direction nonparallel to a longitudinal axis of the torque connector 200. The second torque shoulder 208 and the second surface 214 are to provide a second torque capacity to the torque connector 200.

A third torque shoulder 210 of the pin component 202 is in contact with a third surface 216 of the box component 204 to provide a third torque capacity to the torque connector 200. In the illustrated embodiment, the third torque shoulder 210 comprises a collar 222 threadably coupled to the pin component 202 via threads 226. In other embodiments, the collar 222 is coupled to the pin component 202 using any of a variety of fasteners. In at least one embodiment, the torque capacity of the torque connector 200 comprises the sum of the torque capacities provided by each of: the connection between the first torque shoulder 206 and the first surface 212, the connection between the second torque shoulder 208 and the second surface 214, and the connection between the third torque shoulder 210 and the third surface 216.

Figure 3:
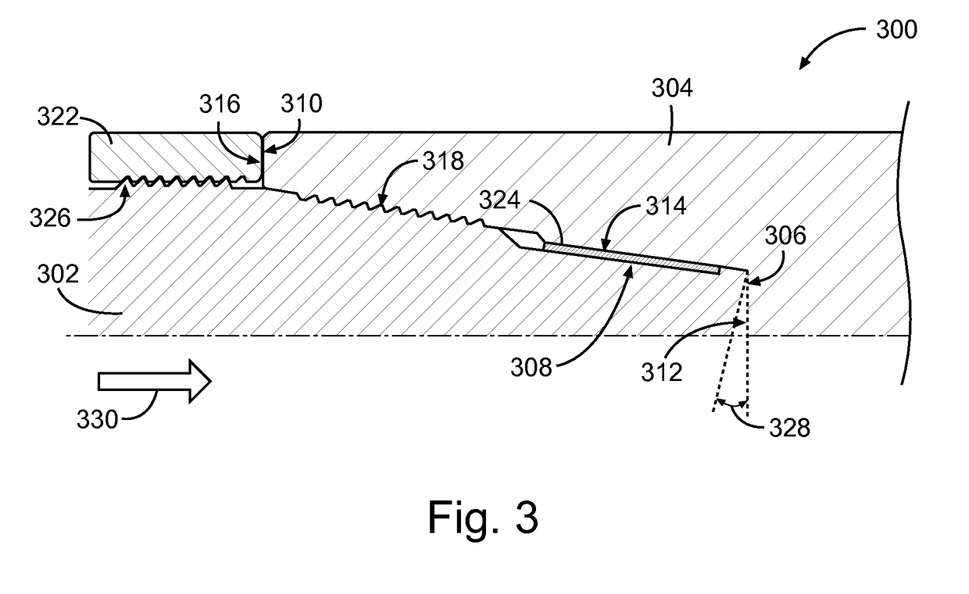
FIG. 3 depicts a cross-section view of yet another example torque connector, in accordance with some embodiments.

FIG. 3 depicts a cross-section view of an example torque connector 300, in accordance with some embodiments. A pin component 302 is coupled to a box component 304 via threaded surface 318. A first torque shoulder 306 of the pin component 302 is in contact with a first surface 312 of the box component 304 to provide a first torque capacity to the torque connector 300. In the illustrated embodiment, the angle 328 of the first torque shoulder 306 and the first surface 312 is less than 90° relative to a direction of insertion 330 of the pin component 302 into the box component 304. In some embodiments, the angle 328 of the first torque shoulder 306 and the first surface 312 is more than 90° relative to the direction of insertion 330 of the pin component 302 into the box component 304. In at least one embodiment, the angle 328 of the first torque shoulder 306 and the first surface 312 relative to the direction of insertion 330 is chosen to increase the torque capacity of the torque connector 300.

A sacrificial material 324 is disposed between a second torque shoulder 308 of the pin component 302 and a second surface 314 of the box component 304. In at least one embodiment, the sacrificial material 324 is attached to the second torque shoulder 308 or the second surface 314. In at least one embodiment, the sacrificial material 324 is compressed between the second torque shoulder 308 and the second surface 314 in a direction nonparallel to the direction of insertion 330 of the pin component 302 into the box component 304. The second torque shoulder 308 and the second surface 314 are to provide a second torque capacity to the torque connector 300.

A third torque shoulder 310 of the pin component 302 is in contact with a third surface 316 of the box component 304 to provide a third torque capacity to the torque connector 300. In the illustrated embodiment, the third torque shoulder 310 comprises a collar 322 threadably coupled to the pin component 302 via threads 326. In other embodiments, the collar 322 is coupled to the pin component 302 using any of a variety of fasteners. In at least one embodiment, the torque capacity of the torque connector 300 comprises the sum of the torque capacities provided by each of: the connection between the first torque shoulder 306 and the first surface 312, the connection between the second torque shoulder 308 and the second surface 314, and the connection between the third torque shoulder 310 and the third surface 316.

Figure 4:
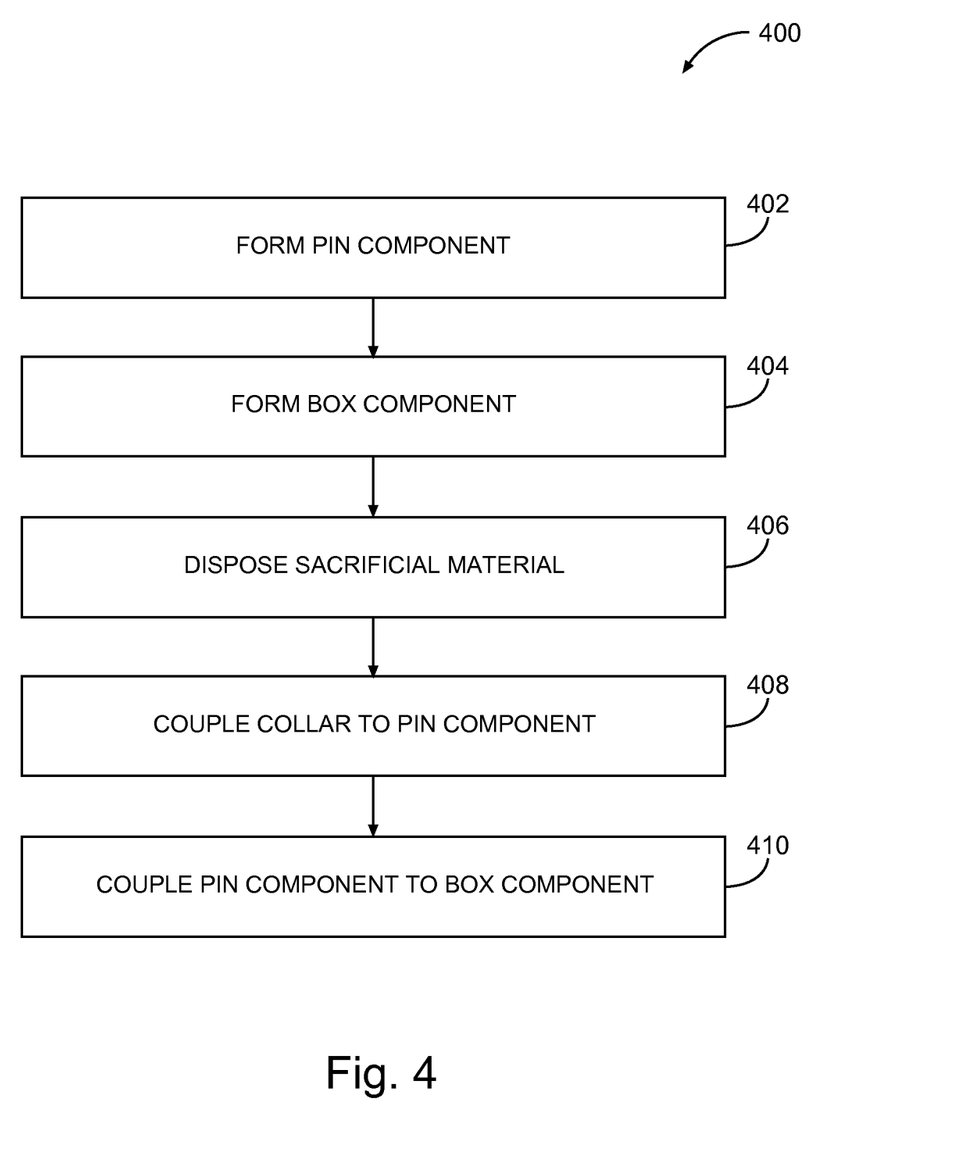
FIG. 4 is a flow diagram of an example method of manufacturing a torque connector, in accordance with some embodiments.

FIG. 4 is a flow diagram of an example method 400 of manufacturing a torque connector, in accordance with some embodiments. As a matter of convenience, the method 400 is described with reference to the torque connector 200 of FIG. 2.

At block 402 the pin component 202 is formed. In at least one embodiment, the pin component 202 is formed with the first torque shoulder 206 and the second torque shoulder 208. In some embodiments, the pin component 202 is further formed with a third torque shoulder 210. In at least one embodiment, the first torque shoulder 206 is formed nonperpendicular to the direction of insertion 230 of the pin component 202 into the box component 204. In at least one embodiment, the first torque shoulder 206 is formed at a leading end of the pin component 202. In some embodiments, the second torque shoulder 208 is formed nonperpendicular to the direction of insertion 230 of the pin component 202 into the box component 204. In some embodiments, torque shoulder 206, 208, 210 are formed so as to achieve a desired torque capacity of the torque connector 200.

In some embodiments, the pin component 202 is formed with threaded surface 218 to threadably couple the pin component 202 to the box component 204. In at least one embodiment, the pin component 202 is formed to provide a clearance fit between the second torque shoulder 208 of the pin component 202 and the second surface 214 of the box component 204. The pin component 202 is formed using any of a variety of materials. In some embodiments, the material of the pin component 202 is selected based on the desired strength of the torque connector 200. In at least one embodiment, the pin component 202 comprises steel. In at least one embodiment, the pin component 202 is formed without the use of precision machining.

At block 404, the box component 204 is formed. In at least one embodiment, the box component is formed with the first surface 212 to correspond to the first torque shoulder 206 of the pin component 202 and the second surface 214 to correspond to the second torque shoulder 208 of the pin component 202. In some embodiments, the box component 204 is formed with a third surface 216 to correspond to the third torque shoulder 210. In at least one embodiment, the second surface 214 is formed non-perpendicular to the direction of insertion 230 of the pin component 202 into the box component 204. In some embodiments, the box component 204 is formed with threaded surface 218 to threadably couple the pin component 202 to the box component 204. In at least one embodiment, the box component 204 is formed to provide a clearance fit between the second torque shoulder 208 of the pin component 202 and the second surface 214 of the box component 204. For example, in at least one embodiment, the pin component 202 and the box component 204 are formed such that the second torque shoulder 208 and the second surface 214 comprise a clearance fit of about 1% to about 5% of a largest outer diameter of the pin component 202. The box component 204 is formed using any of a variety of materials. In some embodiments, the material of the box component 204 is chosen based on a desired strength of the torque connector 200. In at least one embodiment, the box component 204 comprises the same material as the pin component 202. In some embodiments, the box component 204 comprises steel. In at least one embodiment, the box component 204 is formed without the use of precision machining.

At block 406, the sacrificial material 224 is disposed between the pin component 202 and the box component 204. In some embodiments, the sacrificial material 224 is attached to the box component 204. In at least one embodiment, the sacrificial material 224 is attached to the pin component 202. In some embodiments, the sacrificial material 224 is disposed such that the sacrificial material 224 is compressed between the pin component 202 and the box component 204 when the pin component 202 is coupled to the box component 204. In at least one embodiment, the sacrificial material 224 is compressed between the second torque shoulder 208 and the second surface 214. In some embodiments, the sacrificial material 224 is deformed in a direction nonparallel to the direction of insertion 230 of the pin component 202 into the box component 204. In some embodiments, the method 400 does not include disposing the sacrificial material 224, and instead the method 400 results in a torque connector 200 comprising three torque shoulders 206, 208, 210 and three surfaces 212, 214, 216 without the use of the sacrificial material 224.

At block 408, the collar 222 is coupled to the pin component 202. In some embodiments, the collar 222 is coupled to the pin component 202 prior to the sacrificial material 224 being disposed between the pin component 202 and the box component 204. In at least one embodiment, the collar 222 is threadably coupled to the pin component 202 via threads 226. In other embodiments, the collar 222 is coupled to the pin component 202 via any of a variety of couplers. In some embodiments, the collar 222 forms the third torque shoulder 210 against the third surface 216 of the box 204. In some embodiments, the method 400 does not include coupling the pin collar 222 to the pin component 202, and instead the method 400 results in a torque connector 200 comprising two torque shoulders 206, 208, two surfaces 212, 214, and the sacrificial material 224.

At block 410, the pin component 202 is coupled to the box component 204. In at least one embodiment, the pin component 202 is threadably coupled to the box component 204 via the threaded surface 218. In at least one embodiment, the threaded surface 218 provides a fourth torque capacity to the torque connector 200. In some embodiments, the pin component 202 is coupled to the box component 204 by a user or technician rather than during the manufacturing process. Torque forces can then be applied to the torque connector 200.

Figure 5:
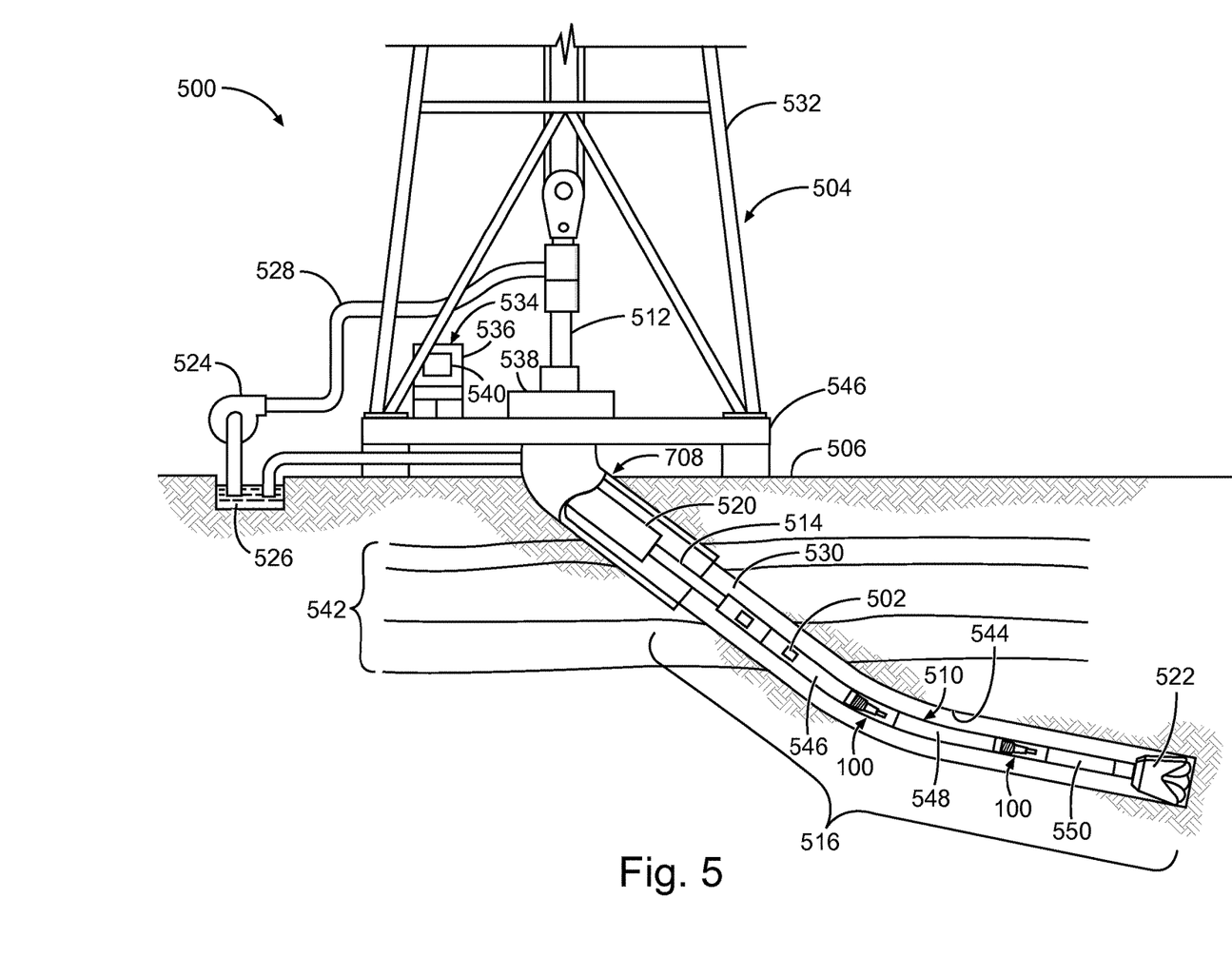
FIG. 5 depicts an example system at a drilling site, in accordance with some embodiments.

FIG. 5 depicts an example system 500 at a drilling site, in accordance with some embodiments. In the illustrated embodiment, the system 500 may form a portion of a drilling rig 504 located at the surface 506 of a well 508 at a drilling platform 546 equipped with a derrick 532. The drilling rig 504 may provide support for a drill string 510. The drill string 510 may operate to penetrate a rotary table 538 for drilling a borehole 544 through subsurface formations 542. The drill string 510 may include a Kelly 512, drill pipe 514, and a bottom hole assembly 516, perhaps located at the lower portion of the drill pipe 514. In at least one embodiment, the drill string 510 is a tubular string comprising a plurality of tubular members 546, 548, 550 connected by a plurality of connectors 100, such as the torque connector 100 of FIG. 1. In other embodiments, the torque connectors 100 may comprise one or more features found in the torque connectors 200, 300 of FIG. 2 and FIG. 3, respectively.

The bottom hole assembly 516 may include drill collars 520, a down hole tool 502, and a drill bit 522. The drill bit 522 may operate to create the borehole 544 by penetrating the surface 506 and the subsurface formations 542. The down hole tool 502 may comprise any of a number of different types of tools including measurement while drilling (MWD) tools, logging while drilling (LWD) tools, and others.

During drilling operations, the drill string 510 (perhaps including the Kelly 512, the drill pipe 514, and the bottom hole assembly 516) may be rotated by the rotary table 538. Although not shown, in addition to, or alternatively, the bottom hole assembly 516 may also be rotated by a motor (e.g., a mud motor) that is located down hole. The drill collars 520 may be used to add weight to the drill bit 522. The drill collars 520 may also operate to stiffen the bottom hole assembly 516, allowing the bottom hole assembly 516 to transfer the added weight to the drill bit 522, and in turn, to assist the drill bit 522 in penetrating the surface 506 and subsurface formations 542.

During drilling operations, a mud pump 524 may pump drilling fluid (sometimes known by those of ordinary skill in the art as "drilling mud") from a mud pit 526 through a hose 528 into the drill pipe 514 and down to the drill bit 522. The drilling fluid can flow out from the drill bit 522 and be returned to the surface 506 through an annular area 530 between the drill pipe 514 and the sides of the borehole 544. The drilling fluid may then be returned to the mud pit 526, where such fluid is filtered. In some embodiments, the drilling fluid can be used to cool the drill bit 522, as well as to provide lubrication for the drill bit 522 during drilling operations. Additionally, the drilling fluid may be used to remove subsurface formation cuttings created by operating the drill bit 522.

Some embodiments include a surface logging facility 534 for processing, analysis, and/or storage of measurement or other data. The processing and analysis may include natural gamma-ray spectroscopy measurements and/or determination of formation density. The logging facility 534 may be provided with electronic equipment for various types of signal processing.

A workstation 536 and the controller 540 may include modules comprising hardware circuitry, a processor, and/or memory circuits that may store software program modules and objects, and/or firmware, and combinations thereof, as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments. While the illustrated embodiment depicts the torque connector 100 used with a drill string 510, in other embodiments, the torque connector 100 may be used in any of a variety of settings, with any of a variety of tubular strings.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A torque connector comprising:
a box component;
a pin component to couple to the box component, comprising:
   a first torque shoulder to contact a first surface of the box component to provide a first torque capacity to the torque connector; and
   a second torque shoulder to contact a second surface of the box component to provide a second torque capacity to the torque connector;
a sacrificial material disposable between the second torque shoulder of the pin component and the second surface of the box component; and
a collar comprising threads to couple to the pin components, the collar comprising a third torque shoulder in contact with a third surface of the box component to provide a third torque capacity to the torque connector.

2. The torque connector of claim 1, further comprising a threaded surface to couple the pin component to the box component.

3. The torque connector of claim 1, further comprising a third torque shoulder to contact a third surface of the box component to provide a third torque capacity to the torque connector.

4. The torque connector of claim 1, wherein the first shoulder comprises a leading surface of the pin component.

5. The torque connector of claim 1, wherein the first shoulder is non-perpendicular to a longitudinal axis of the pin component.

6. The torque connector of claim 1, wherein the pin component is configured to deform the sacrificial material in a direction non-parallel to a direction of insertion, to increase torque capacity of the torque connector, when the pin component is coupled to the box component.

7. The torque connector of claim 1, wherein the sacrificial material comprises at least one of: copper, beryllium copper, aluminum bronze, copper-nickel-tin alloy, or nickel-beryllium alloy.

8. The torque connector of claim 1, wherein the sacrificial material has a coefficient of thermal expansion that is greater than a coefficient of thermal expansion for the pin component or the box component.

9. The torque connector of claim 1, wherein the sacrificial material is attached to one of the pin component or the box component.

10. A tubular string comprising:
a plurality of tubular members; and
a plurality of torque connectors connecting the plurality of tubular members, at least one torque connector of the plurality of torque connectors comprising:
   a box component; and
   a pin component threadably coupled to the box component, comprising:
      a first torque shoulder in contact with a first surface of the box component to provide a first torque capacity to the torque connector;
      a second torque shoulder in contact with a second surface of the box component to provide a second torque capacity to the torque connector, wherein the first surface of the box component and the second surface of the box component are non-parallel; and
      a third torque shoulder in contact with a third surface of the box component to provide a third torque capacity to the torque connector, wherein the third torque shoulder comprises a collar having threads to couple to the pin component.

11. The tubular string of claim 10, wherein the at least one torque connector further comprises a sacrificial material disposed between the second torque shoulder of the pin component and the second surface of the box component.

12. The tubular string of claim 11, wherein the sacrificial material is compressed between the pin component and the box component in a direction nonparallel to a longitudinal axis of the torque connector.

13. A method, comprising:
forming a pin component of a torque connector comprising a first torque shoulder, a second torque shoulder, and a third torque shoulder;
forming a box component of a torque connector comprising a first surface to correspond to the first torque shoulder, a second surface to correspond with the second torque shoulder, and a third surface to correspond with the third torque shoulder;
forming a collar as the third torque shoulder and threadably coupling the collar to the pin component; and
disposing a sacrificial material on the second surface of the box component or the second torque shoulder of the pin component, such that the sacrificial material is to be compressed between the second torque shoulder and the second surface when the pin component is coupled to the box component.

14. The method of claim 13, further comprising:
forming the second torque shoulder on the pin component non-perpendicular to a direction of insertion of the pin component into the box component; and
forming the second surface on the box component non-perpendicular to the direction of insertion.

15. The method of claim 13, further comprising forming the first torque shoulder at a leading end of the pin component.

16. The method of claim 15, wherein the first torque shoulder is formed at an angle non-perpendicular to a direction of insertion of the pin component into the box component.

17. The method of claim 13, further comprising forming the torque connector with a clearance fit between the second surface of the box and the second torque shoulder of the pin component.

* * * * *